H. W. MUHLEISEN.
PISTON RING EXTRACTOR.
APPLICATION FILED JULY 23, 1917.
1,278,719. Patented Sept. 10, 1
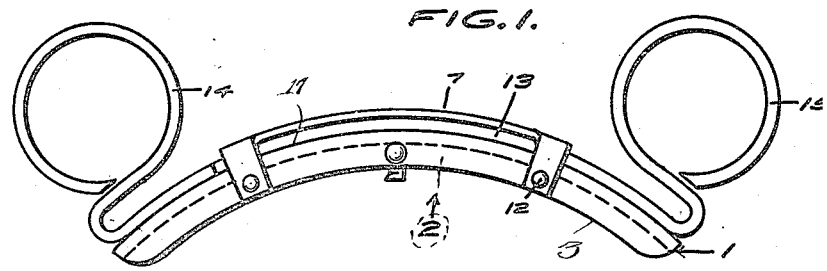
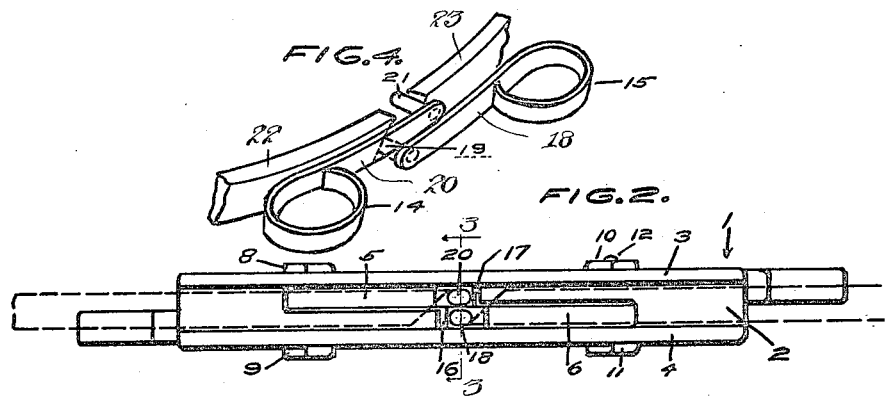
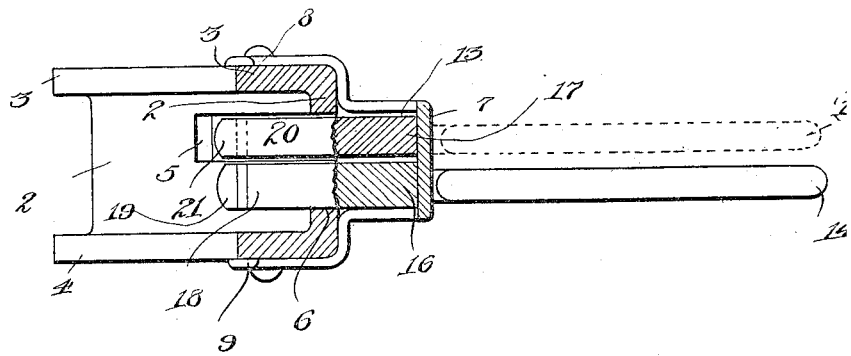
INVENTOR
HENRY W. MUHLEISEN

UNITED STATES PATENT OFFICE.

HENRY W. MUHLEISEN, OF LOS ANGELES, CALIFORNIA, ASSIGNOR TO WILLIAM S. RUSH, OF LOS ANGELES, CALIFORNIA.

PISTON-RING EXTRACTOR.

1,278,719.   Specification of Letters Patent.   Patented Sept. 10, 1918.

Application filed July 23, 1917. Serial No. 182,216.

*To all whom it may concern:*

Be it known that I, HENRY W. MUHLEISEN, a citizen of the United States, residing at Los Angeles, in the county of Los Angeles and State of California, have invented new and useful Improvements in Piston-Ring Extractors, of which the following is a specification.

My object is to make a simple device for removing split spring piston rings from their seats upon the piston without danger of breaking or injuring the rings.

Figure 1 is a plan view of my piston ring extractor ready for use and looking in the direction indicated by the arrow —1— in Fig. 2.

Fig. 2 is an inside elevation looking in the direction indicated by the arrow —2— in Fig. 1, the piston ring being shown in dotted lines.

Fig. 3 is an enlarged cross-section on the line 3—3 of Fig. 2.

Fig. 4 is a perspective illustrating the operation.

The main frame or body 1 is a curved channel iron comprising the central web 2 and the flanges 3 and 4 forming a median web and lateral outside flanges together presenting a curved peripheral external channel. The curvature of the channel is slightly larger than the normal curvature of the piston ring to be handled, and the distance between the flanges 3 and 4 should be only slightly greater than the width of the piston ring. A slot 5 is formed through the central web 2 and extends longitudinally one way from the center, and a similar slot 6 extends the other way, said slots being offset relatively to each other, that is, the slot 5 is just inside of the flange 3 and the slot 6 is just inside of the flange 4. The housing plate 7 is formed integral with attaching plates 8, 9, 10 and 11 and is curved concentric with the channel 1, and the attaching plates are secured to the flanges 3 and 4 by rivets 12 so as to form a concentric bearing or slide-way 13 against the outer face of the channel 1. Handles 14 and 15 are formed integral with slides 16 and 17 fitting side by side in the slide-way 13, the slide 16 being in line with the slot 6 and the slide 17 being in line with the slot 5, and said slides extending in directions opposite of the slots. A finger 18 extends inwardly from the end of the slide 16 through the slot 6 and beyond the inner edges of the flanges 3 and 4, there being a tooth or blade 19 extending from the inner end of the finger, and a similar finger 20 extends from the inner end of the slide 17 through the slot 5 and has a blade or tooth 21 upon its inner end. The blades 19 and 21 extend in opposite directions and in the directions of the slots 5 and 6. The piston rings are slotted on diagonal lines, some being cut one way and some the other, and the fingers 18 and 20 pass each other both ways so that the extractor may be used without change on piston rings cut either way. In other words, it is not necessary to make the extractors partly right handed and partly left handed.

In operation, the operator's thumb is inserted through one of the handles and his first or second finger through the other handle, as in operating a pair of shears. The handles are moved to their extreme outer positions so as to bring the fingers 18 and 20 to the center. Then the device is applied to the periphery of the piston so that the fingers will pass between the ends 22 and 23 of the piston ring and the piston ring will start to enter the channel between the flanges 3 and 4. The blades 19 and 21 have sharp edges which will scrape the bottom of the channel in which the piston ring is seated, and pass under the ends of the ring and raise it from the seat. As soon as the ring has been grasped by the fingers and blades, the handles 14 and 15 are pressed toward each other, thus expanding the ring into the channel 1, and continued movement of the handles expands the piston ring until it is unseated, and may be readily removed from the piston. The slides 16 and 17 carrying the fingers 18 and 20 cross over enough to pass between the ends of a piston ring cut either right handed or left handed and so that pressing the handles together presses the fingers apart. The ring may be held in its expanded position and removed from the piston without any danger of breaking or injuring the ring, and if desired may be restored to place in the same way. The flanges 3 and 4 hold the adjacent ends of the piston ring in alinement so that the fingers 18 and 20 will not slip upon the beveled end faces of the ring.

The details of construction may be varied in many ways without departing from the spirit of my invention as set up in the following claims:

I claim:

1. A piston ring extractor comprising a body having a curved peripheral external channel approximately fitting the periphery of a piston and to receive the abutting ends of a piston ring and having longitudinal slots extending through the median web of the body into the channel, a curved housing plate mounted on the convex side of the body and rigidly secured thereto and forming a slide-way, slides mounted side by side in the slide-way, a handle upon the outer end of one slide, a handle upon the opposite outer end of the other slide, fingers extending inwardly from the slides through the slots and into the channel, and blades upon the inner ends of the fingers; so that when the body is placed against a piston and the fingers inserted between the meeting ends of the piston ring, the blades will engage behind the piston ring, and operation of the handles toward each other will force the ends of the piston ring apart to remove the ring from the cylinder.

2. A piston ring extractor comprising a body having a curved peripheral external channel approximately fitting the periphery of a piston and to receive the abutting ends of a piston ring and having longitudinal slots extending through the median web of the body into the channel, a curved housing plate mounted on the convex side of the body and rigidly secured thereto and forming a slide-way, slides mounted side by side in the slide-way, a handle upon the outer end of one slide, a handle upon the opposite outer end of the other slide, and fingers extending inwardly from the slides through the slots and into the channel; so that when the body is placed against a piston and the fingers inserted between the meeting ends of the piston ring the fingers will engage the ends of the piston ring and operation of the handles toward each other will force the ends of the piston ring apart to remove the ring from the cylinder.

In testimony whereof I have signed my name to this specification.

HENRY W. MUHLEISEN.